May 21, 1940. W. H. LEHMBERG 2,201,315
RESPIRATOR
Filed Nov. 13, 1936 2 Sheets-Sheet 2
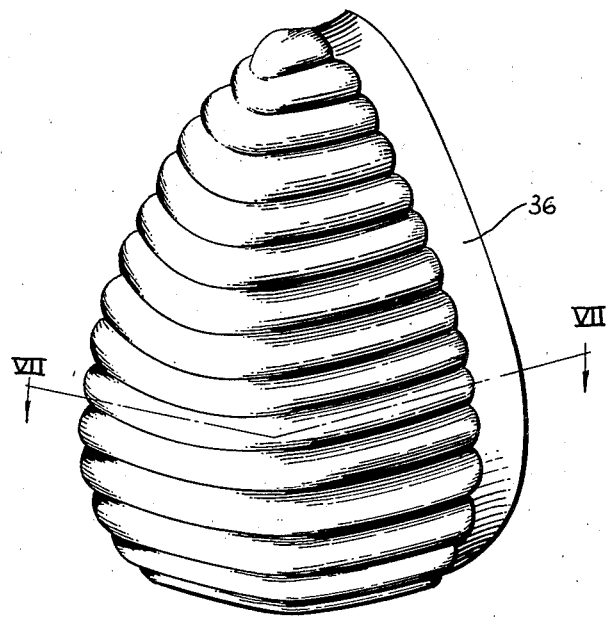
Fig. VI
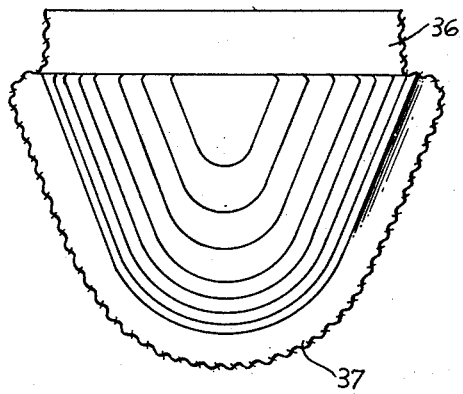
Fig. VII
INVENTOR
William H. Lehmberg
BY
Harry H. Styll
ATTORNEY Patented May 21, 1940

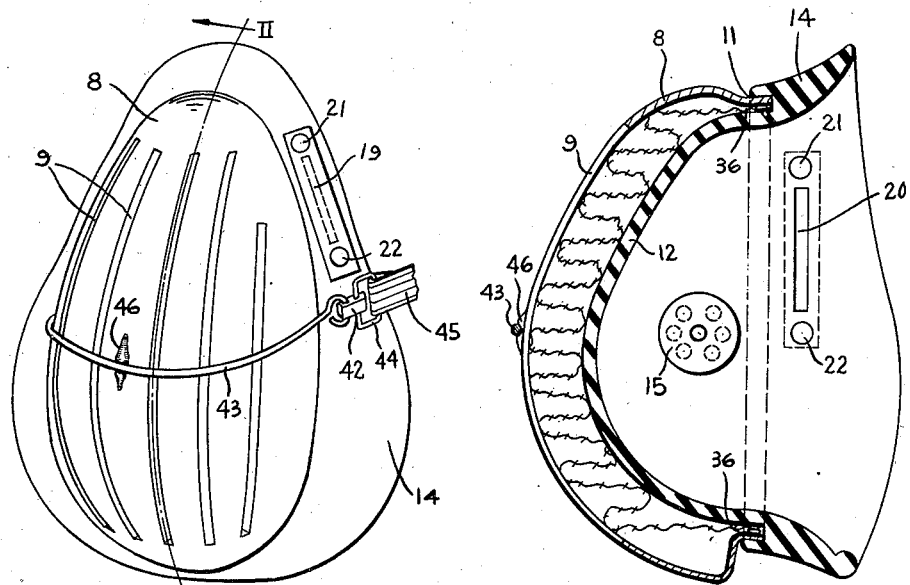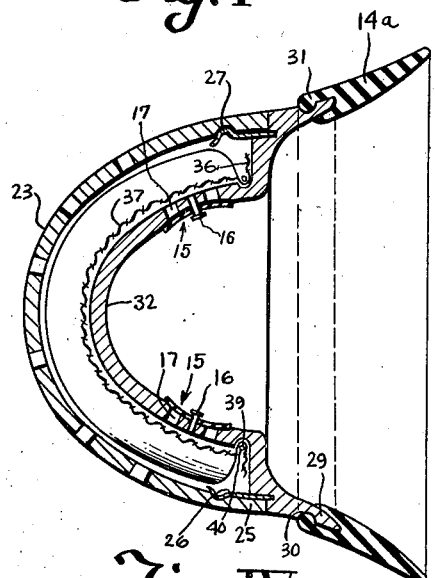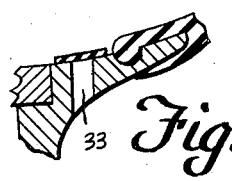

2,201,315

UNITED STATES PATENT OFFICE 2,201,315

RESPIRATOR

William Howard Lehmberg, Sturbridge, Mass., assignor to American Optical Company, Southbridge, Mass., a voluntary association of Massachusetts Application November 13, 1936, Serial No. 110,657

2 Claims. (Cl. 128—146)

This invention relates to respirators.

An object of the invention is to provide a compact respirator in which the filter lies within the walls of the mask or face piece proper, so that the face piece or mask constitutes the entire respirator.

A further object of the present invention is to embody in a respirator a mask having a relatively rigid body portion within which is enclosed a filter.

In the accompanying drawings which illustrate my invention:

Fig. I is a perspective view of a device of the class described embodying my invention;

Fig. II is a vertical section through the device on the line II—II of Fig. I;

Fig. III is a similar section through a modified form of my invention;

Fig. IV is a transverse section on the line IV—IV of Fig. III;

Fig. V is a detailed sectional view on the line V—V of Fig. III;

Fig. VI is a perspective view of a filter adapted for use in a device such as illustrated in Figs. I to IV inclusive; and Fig. VII is a transverse section on the line VII—VII of Fig. VI.

A device of this class is considered a hindrance to the workmen, not only because of the discomfort in wearing the device, but also because to some extent it cuts down the field of vision of the user. This is particularly true when the mask carries one or more structures for housing the filter units through which the air he breathes is passed.

In accordance with the present invention the filter is interposed between dished shells which cooperate to provide a double walled mask or face piece. The air is admitted through openings in the outer shell, passes through the filter, and then through openings through the inner shell. The space afforded between these shells for the filter is necessarily limited due to the restricted size of the mask itself. In order to afford a sufficient filtering of the air and at the same time allow the air to flow through the filter without substantial reduction in pressure, I follow out the principle taught in my co-pending application, Serial Number 102,139 filed September 23, 1936, and preferably arrange the filter in folds. It is thus possible to use relatively dense filter material, such as high quality filtering felt, and at the same time obtain full filtering effect upon the air passing through the shells without inhalation discomfort by virtue of providing greater filter area.

The outer shell 8 is preferably a relatively rigid dished member. I find that "texolite", which is a plastic material, non-inflammable, non-frangible, and of light weight, is well suited for this purpose. It can be molded with openings, such as the slots 9, for admitting the air. Its rim is so shaped as to engage in a corresponding recess 11 in an inner dished shell 12. Between these shells is interposed the filter. Its nature will be more fully described below.

The inner and outer dished shells combine to provide a double walled mask. In the particular embodiment shown in Figs. I and II only the outer shell is of relatively rigid material, but as will be pointed out in connection with the embodiment shown in Figs. III, IV and V, both the inner and outer shell may be relatively rigid.

The mask should fit the face of the user so closely as to prevent leakage of air between the edge portion and the face; and a tight fit is afforded in accordance with the present invention by a flexible edge portion 14 whose flexibility permits it to accommodate itself to the exact shape of the face of the user without discomfort. Preferably, this edge portion is of rubber, as shown. In the embodiment illustrated in Figs. I and II, the inner shell 12 is also flexible; and accordingly this shell and the edge portion are formed in one piece.

The air entering through the slots 9 passes through the filter and is admitted to the interior of the inner shell 12 through an inhalation valve 15 whose structure is more clearly understood from the sectional view of such a valve found in Fig. IV. The seat for the valve is dished so as to cause the edges of the disc shaped flap valve to tend to seat firmly. The stem 16 is fixed in the inner shell and permits a limited amount of lifting of the central portion of the valve from its seat. The perforations 17 through the inner shell permit free flow of air which has been filtered. The exhalation valve 19 is on the exterior of the edge portion 14 and covers a relatively long, narrow slot 20 therein. The valve proper consists of a thin, flexible rubber strip secured at its two ends, as shown at 21 and 22. The exhalation valve is preferably positioned adjacent the upper portion of the mask. If desired, two exhalation valves and two inhalation valves, positioned on opposite sides of the mask, may be employed.

The embodiment of mask shown in Figs. III and IV comprises inner and outer dished shells 32 and 23, both of which are of relatively rigid material. The inner shell 32 has a shoulder 24 against which the edge 25 of the outer shell rests. Spring clips 26 mounted on the inner shell adjacent the shoulder 24 engage notches or slight recesses 27 in the outer shell 23 to hold the same in place against the shoulder 24. The inner shell 32 is offset inwardly at 28 so as to space the inner shell from the outer shell and provide a chamber for the filter. The rim 29 of the inner shell 32 is thinned out toward its edge and in addition is provided with an external groove 30 running completely around the rim. A rubber edge portion 14a is formed as a separate member with a bead 31 which fits in the groove 30. In addition, this rubber edge portion is slotted to receive the thinned out edge 29 of the shell 32. This interlocking of the rim of the shell 32 and the edge portion 14a provides a tight connection and holds the member 14a securely in position. Its flexibility causes it to conform to the face of the user without discomfort to the latter.

The inhalation valve has already been described. The exhalation valve may be substantially the same as the valve 19 of the first embodiment. The opening through which the air discharges is preferably arranged in the rim of the dished shell 32 which is of relatively rigid material. As shown in Figs. III and V, a plurality of openings 33 may be employed instead of the slot 20 as in the first embodiment.

A form of filter suitable for use in my improved respirator is shown in Figs. VI and VII, its shape conforming in general to the dished shape of the respirator mask. This filter comprises a flange 36 by which it is fixed in position within the respirator. The effective portion 37 of the filter is formed with a sinuous contour, and in the particular embodiment shown in Figs. VI and VII, parallel corrugations are formed in the portion 37. This increases the effectiveness of the filter, not only because of increasing the superficial area of the filter, but also because a substantial portion of the particles carried along by the air strike the fibrous material at an angle.

In assembling the inner and outer dished shells with the filter, the latter is secured tightly in position by its flange 36. In the embodiment shown in Figs. I and II, the flange 36 is wedged in the recess 11 by the insertion of the rim of the outer shell 8. In the embodiment illustrated in Figs. III and IV, the inner shell 32 is provided with a groove 39 for aiding in securing the flange 36 to this shell. As shown clearly in the drawings, a binding element, such as a cord or wire 40, clamps the flange 36 in the groove 39.

A simple arrangement of clamp and head-band is illustrated in Fig. I for mounting the respirator on the head of the user. Lugs 42 on the edge portion 14 carry a bail 43 and rings 44. The ends of a head-band 45 are connected to the rings 44. The bail engages a notched lug 46 on the front of the shell 8. The bail 43 may be readily dislodged from this notched lug 46 and swung out of the way of the shell 8 so that the latter may be quickly removed, the filter inspected or replaced, and the shell 8 then put back in position and locked by swinging the bail 43 to the position shown in Fig. I.

A device embodying my invention exhibits the advantage of compactness since the filter is housed between inner and outer dished shells which cooperate in providing the mask proper. This mask obstructs the view to a minimum extent since projecting parts have been reduced to a minimum. The device is relatively light and not easily damaged. There are no parts exposed which are easily broken or dented and the mask is capable of withstanding rough usage, particularly when the outer shell 8 is formed of non-frangible material such as "texolite". The outer shell 8 protects the filter from oil and dirt, and injury due to handling of the filter, which adds materially to the length of time it can be kept in service.

While I have illustrated and described certain embodiments of my invention which I at present prefer, it will be understood that the invention may be otherwise employed and practiced within the scope of the following claims.

I claim:

1. A device of the class described comprising a face piece composed of superimposed members of impermeable material having spaced walls cupped to fit over the nose and mouth with said members each having a vent opening therein with at least one of said openings having an inhalation valve cooperatively aligned therewith and with at least one of said members having a resilient face engaging portion for engagement with the face for preventing leakage under said face piece, the walls of said members being substantially equally spaced throughout the major portion thereof to afford a breathing space therebetween and having converging interfitting peripheral portions for connecting said members and for retaining said spaced relation, filter means of sheet-like material initially cupped substantially to the shape of and to fit in the space between the walls of said superimposed members, said filter means having a plurality of corrugations extending transversely of the face piece with the folds of said corrugations so dimensioned that the crests thereof will have a substantially line contact with the spaced walls of said superimposed members substantially throughout the width thereof with the folds progressively arranged in the direction of the length of the area of the face piece overlying the nose and mouth, means adjacent the converging interfitting peripheral portions of the superimposed members for sealing the edge to prevent the entrance of air into the face piece other than through the filter means and inhalation valve, said filter means being such as to retain its cupped and corrugated shape when disassociated with the face piece, and means for retaining the superimposed portions of said face piece in assembled relation with the peripheral portions in interfitted relation with each other.

2. A device of the class described comprising a face piece composed of superimposed members of impermeable material having spaced walls cupped to fit over the nose and mouth with said members each having a vent opening therein with at least one of said openings having an inhalation valve cooperatively aligned therewith and with at least one of said members having a peripheral edge portion shaped to receive a resilient face engaging member, a resilient face engaging member having a grooved edge shaped to receive the peripheral edge of said member to be fitted therewith and having an opposed edge shaped to engage the face for preventing leakage under said face piece, the walls of said members being substantially equally spaced throughout the portion thereof to afford a breathing space therebetween and having converging interfitting peripheral portions for connecting said members and for retaining said spaced relation, filter means of sheet-like filtering material initially cupped substantially to the shape of and to fit in the space between the walls of said superimposed members, said filter means having a plurality of corrugations extending transversely of the face piece and blending into a continuous flange-like edge portion with the folds of said corrugations so dimensioned that the crests thereof will have a substantially line contact with the spaced walls of said superimposed members substantially throughout the width thereof with the folds progressively arranged in the direction of the length of the area of the face piece overlying the nose and mouth, means adjacent the converging interfitting peripheral portions of the superimposed members engaging the continuous edge portion of the filter means for sealing said portion with at least one of said superimposed members to prevent the entrance of air into the face piece other than through the filter means and inhalation valve, said filter means being such as to retain its cupped and corrugated shape when disassociated with said face piece and means for retaining the superimposed portions of the face piece in assembled relation with the peripheral portions in interfitted relation with each other.

WILLIAM HOWARD LEHMBERG.